United States Patent

Okumura et al.

[11] Patent Number: 5,762,266
[45] Date of Patent: Jun. 9, 1998

[54] HEATING APPARATUS

[75] Inventors: Yoshihiko Okumura; Koichi Ito, both of Kariya; Yoshimitsu Inoue, Chiryu; Hikaru Sugi, Nagoya, all of Japan

[73] Assignee: Denso Corporation, Kariya, Japan

[21] Appl. No.: 676,820

[22] Filed: Jul. 8, 1996

[30] Foreign Application Priority Data

Jul. 10, 1995 [JP] Japan .................. 7-173730

[51] Int. Cl.⁶ .................................. B60H 1/02
[52] U.S. Cl. ............... 237/12.3 B; 237/2 A; 237/12.3 A
[58] Field of Search .............. 237/12.3 B, 2 A, 237/12.3 A

[56] References Cited

U.S. PATENT DOCUMENTS

| | | | |
|---|---|---|---|
| 4,195,777 | 4/1980 | Ikebukuro et al. | 237/12.3 B |
| 4,300,720 | 11/1981 | Baier et al. | 237/12.3 B |
| 4,905,893 | 3/1990 | Kiskis | 237/12.3 B |
| 4,946,097 | 8/1990 | Kawamura | 237/2 A |
| 4,949,553 | 8/1990 | Suzuki | 62/238.7 |
| 4,984,736 | 1/1991 | Reiser et al. | 237/2 A |
| 4,991,643 | 2/1991 | Price et al. | 165/38 |
| 5,456,408 | 10/1995 | Appel | 237/2 A |
| 5,617,995 | 4/1997 | Yasuda et al. | 237/12.3 B |

FOREIGN PATENT DOCUMENTS

| | | |
|---|---|---|
| A0138409 | 8/1982 | Japan . |
| A-59-114118 | 7/1984 | Japan . |
| A-63-8011 | 1/1988 | Japan . |
| A-4-173423 | 6/1992 | Japan . |
| A-4-365616 | 12/1992 | Japan . |
| A-5-155241 | 6/1993 | Japan . |

*Primary Examiner*—Henry A. Bennett
*Assistant Examiner*—Derek S. Boles
*Attorney, Agent, or Firm*—Harness, Dickey & Pierce, PLC

[57] ABSTRACT

The total flow rate of the hot water flowing to a first heater core and a second heater core is controlled by a total flow rate control valve, and then the flow rate of the hot water to each of the heater cores is distributed by a distribution valve. According to this configuration, the flow rate of the hot water flowing through each of the heater cores is linearly controlled. Therefore, the heating of the driver's seat space by the first heater core and the heating of the air conditioning of the passenger's seat space by the second heater core can be linearly controlled.

13 Claims, 13 Drawing Sheets

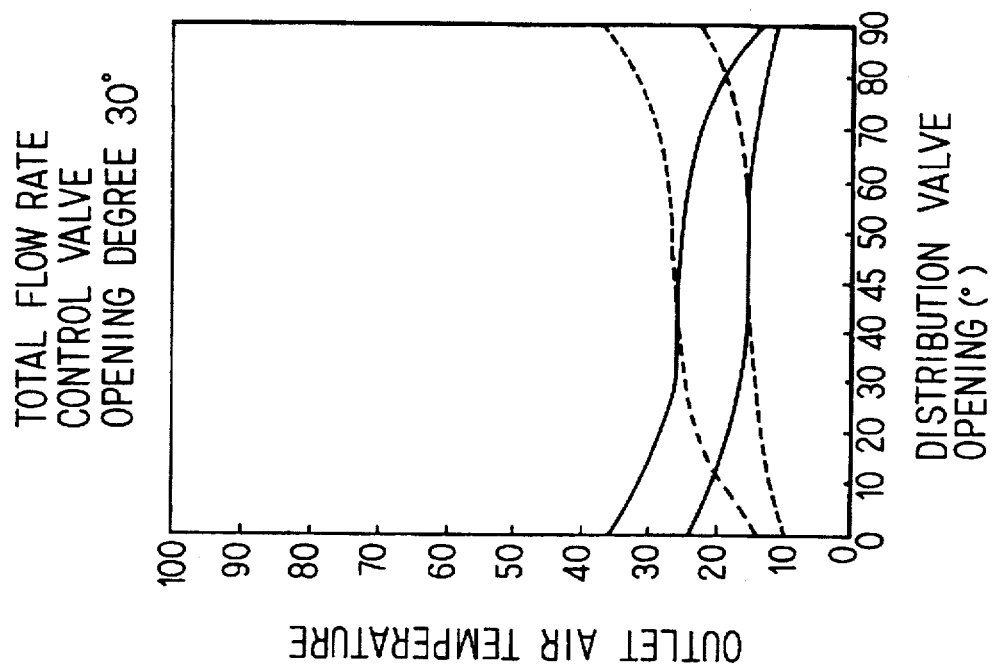
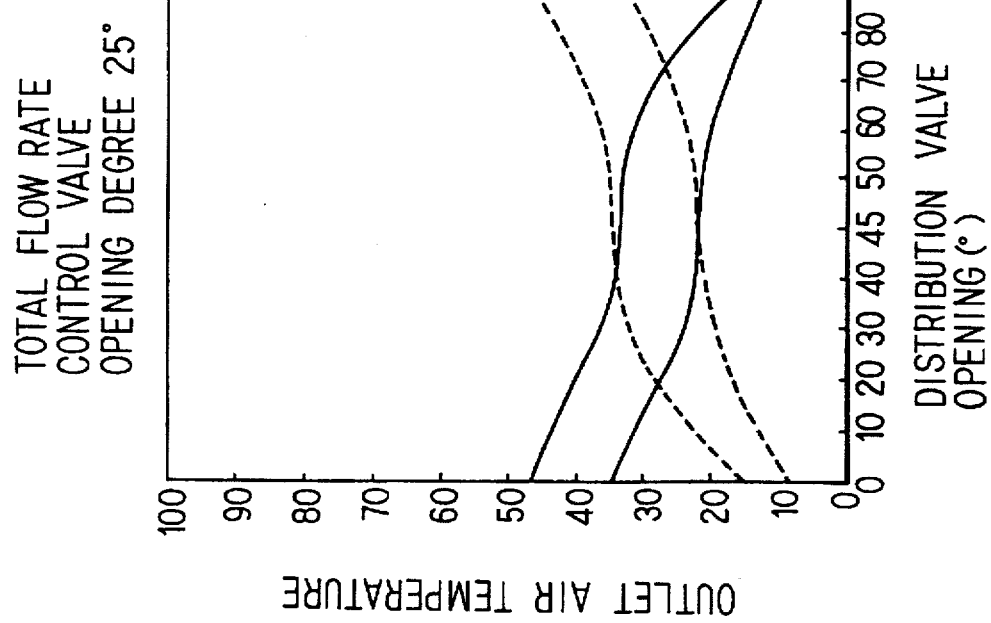

5,762,266

HEATING APPARATUS

CROSS REFERENCE TO RELATED APPLICATIONS

This application is based on and claims priority of Japanese Patent Application No. Hei. 7-173730 filed on Jul. 10, 1995, the content of which is incorporated herein by reference.

BACKGROUND OF THE INVENTION

1. Field of the Invention

The present invention generally relates to a heating apparatus using a flow control valve for controlling the flow rate of hot water. More particularly, the present invention can be preferably applied to a heating apparatus for a vehicle.

2. Description of the Related Art

Conventionally, as a system for controlling the temperature of the blowing air of the automotive air conditioner including a hot water type heater, a method for controlling the temperature of the blowing air by controlling the flow rate of the hot water to the heat exchangers for heating has been known. The hot water flow rate control type has the following advantages as compared with the air mixing type for controlling the temperature of the blowing air.

In the air conditioner of the hot water flow rate control type, since a space for mixing cool air and hot air which is required in the air conditioner of the air mixing type is not required, the volume of the air flowing duct system can be reduced as much as the eliminated mixing space. Furthermore, since air mixing space is eliminated, the airflow resistance can be reduced, the consumed electric power of the blower and the air blow noise can be reduced.

An automotive air conditioner employing the hot water flow rate control type described above has been proposed, as disclosed in JP-A-59-114118.

In this automotive air conditioner, as illustrated in FIG. 14, the flow rates of the hot water to each of a first heater core 101 and to a second heater core 102 are controlled by a flow control valve 103. Furthermore, when the system is operated in a bi-level mode in which the air is blown into the passenger compartment from both an upper air outlet 104 and a foot air outlet 105, an opening valve 106 is closed to stop the hot water supply to the first heater core 101, and thereby the temperature of the air blown from the upper air outlet 104 is lowered, and the temperature of the air blown from the foot air outlet 105 is raised.

The opening valve 106 functions solely to switch between the supply and the stop of the hot water to the first heater core 101, but not to linearly control the amount of the hot water supplying to the first heater core 101 and the second heater core 102. Accordingly, even if the temperature is independently controlled for each of the right and left sides based on the concept described in the above publication for example, the air which has passed through the first heater core 101 is blown to the driver's seat and the air which has passed through the second heater core 102 is blown to the passenger's seat next to the driver's seat. Therefore, the temperature of the air blown to each seat can not be linearly controlled.

SUMMARY OF THE INVENTION

In view of the above problem, it is an object of the present invention to provide a heating apparatus, in which a first heat exchanger and a second heat exchanger are respectively disposed in a first passage and a second passage branched from a hot water circuit, a first space in the passenger compartment is heated by the first heat exchanger and a second space in the passenger compartment is heated by the second heat exchanger, capable of heating the first space and the second space independently by linearly controlling the flow rates of the hot water to each of the heat exchangers.

According to the present invention, in a heating apparatus for heating a passenger compartment by a first heat exchanger and a second heat exchanger disposed in a hot water circuit, a total flow rate control valve is disposed within a hot water circuit to control a total flow rate of the hot water flowing through the first heat exchanger or the second heat exchanger, and a distribution valve is disposed within the hot water circuit to Linearly distribute the hot water, flow rate of which has been controlled by the total flow rate control valve, to the first heat exchanger and the second heat exchanger.

In this way, the hot water whose flow rate has been controlled by the total flow rate control valve can be linearly distributed by the distribution valve to the first heat exchanger and the second heat exchanger. Therefore, the capacity of the first heat exchanger for heating the first space in the passenger compartment (or the room) and the capacity of the second heat exchanger for heating the second space in the passenger compartment (or the room) can be linearly controlled. As a result, the heating of the first space and the second space can linearly be controlled.

A pressure responsive valve may be disposed in a bypass circuit in the hot water circuit so as to be opened by an increase in the hot water pressure. In this way, even if the hot water supply pressure of the engine fluctuates, the hot water pressure on the first heat exchanger and the second heat exchangers can be maintained at a constant level. As a result, the fluctuation in the blowing air temperature can be controlled.

The distribution valve may be disposed at a portion on which the first passage and the second passage join together or a portion from which the hot water circuit branches into the first passage and the second passage. Therefore, the function of distributing the hot water, flow rate of which has been controlled by the total flow rate control valve, to the first and second passages can be achieved by one valve.

The first and second heat exchangers may be constructed as a single heat exchanger, and furthermore, the total flow rate control valve and the distribution valve may be constructed integrally with the heat exchanger. Therefore, the total flow rate control valve, the distribution valve and the heat exchangers can be incorporated into a integrated structure, the work for mounting such unit onto a vehicle can be easily performed.

BRIEF DESCRIPTION OF THE DRAWINGS

Additional objects and advantages of the present invention will be more readily apparent from the following detailed description of preferred embodiments thereof when taken together with the accompanying drawings in which;

FIGS. 10A and 10B are maps of experimental data illustrating relations between the opening degree of the distribution valve and the blowing air temperature, wherein FIGS. 10A illustrates such relations when the opening degree of the total flow rate control valve 4 is 25°, and FIG. 10B illustrates such relations when the opening degree of the total flow rate control valve is 30;

FIGS. 11A and 11B are maps of experimental data illustrating relations between the opening degree of the distribution valve 7 and the outlet temperature, wherein FIG. 11A illustrates such relations when the opening degree of the total flow rate control valve 4 is 40°, and FIG. 11B illustrates such relations when the opening degree of the total flow rate control valve is 90°;

DETAILED DESCRIPTION OF THE PREFERRED EMBODIMENTS

Now, referring to FIGS. 1 to 12, a first embodiment in which the present invention is applied to a hot water type heater for an automotive air conditioner is described.

Figure 1:
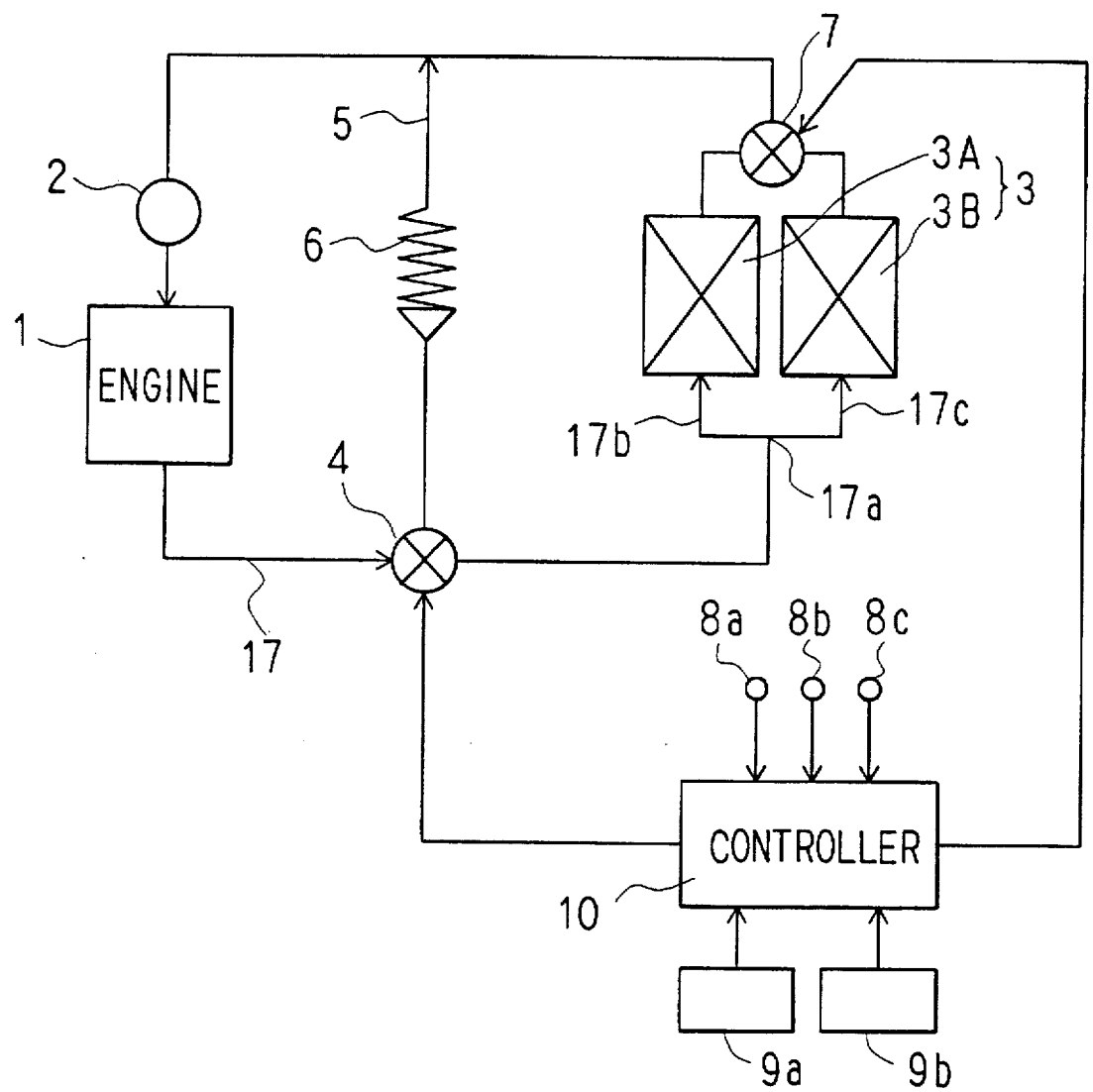
FIG. 1 is a diagram of a hot water circuit of a first embodiment according to the present invention.

In FIG. 1, a water pump 2 is driven by a water cooled type engine 1 to circulate hot water through a hot water circuit 17 of the engine 1. The hot water circuit 17 branches from a branching portion 17a into a first passage 17b and a second passage 17c. At the respective intermediate points of the first passage 17b and second passage 17c are disposed a first heater core 3A and a second heater core 3B respectively. At a connecting portion 17d (FIG. 13) of the first passage 17b and second passage 17c is disposed a distribution valve 7.

Each of the first heater core 3A and the second heater core 3B is a heating heat exchanger which heat exchanges the hot water supplied from the engine 1 with the blowing air in the an air conditioning duct 12 (FIG. 2) to heat the blowing air. The first heater core 3A and the second heater core 3B are composed of halves of the core part of one heater core 3 (FIG. 3) respectively.

A total flow rate control valve 4 has a valve structure of a three-way valve type, provided with three hot water inlets and outlets. The detailed structure of the total flow rate control valve 4 will be described later.

A bypass circuit 5 is disposed in parallel to the heater core 3. A constant differential pressure valve 6 (pressure responsive valve) opens when the difference in pressure between the positions before and behind thereof reaches a predetermined value. With such function, the constant differential pressure valve 6 controls the difference in pressure between the positions before and behind the heater core 3 to a constant value despite the fluctuation in the discharge pressure of the water pump 2 due to the variation in the rotational speed of the engine 1.

Although not specifically illustrated in FIG. 1, the bypass circuit 5 and the constant differential pressure valve 6 is incorporated in the total flow rate control valve 4, and the total flow rate control valve 4 is integrally assembled into the heating heat exchanger 3. The assembled structure will be also described later.

The distribution valve 7 distributes the flow rate of the hot water adjusted by the total flow rate control valve 4 to the flow rate for the first heater core 3A and the flow rate for the second heater core 3B. The detailed structure of the distribution valve 7 will be described later.

An inside air temperature sensor 8a detects the temperature of the inside of the passenger compartment, an outside air temperature sensor detects the temperature of the outside air, and an insolation sensor 8c detects an amount of the sunlight irradiated into the passenger compartment.

Temperature setting devices 9a and 9b are disposed on an air conditioning operation panel (not illustrated) provided in front of seats in the passenger compartment. The temperature setting device 9a is for the driver's seat, and the temperature setting device 9b is for the passenger's seat. A controller 10 includes a ROM, a RAM, a microcomputer, etc., which executes a prescribed process described later based on the input signals from the inside air temperature sensor 8a, the outside air temperature sensor 8b, the insolation sensor 8c, the temperature setting devices 9a and 9b, and so on, and outputs the control signals to the total flow rate control valve 4, the distribution valve 7, and so on.

Figure 2:
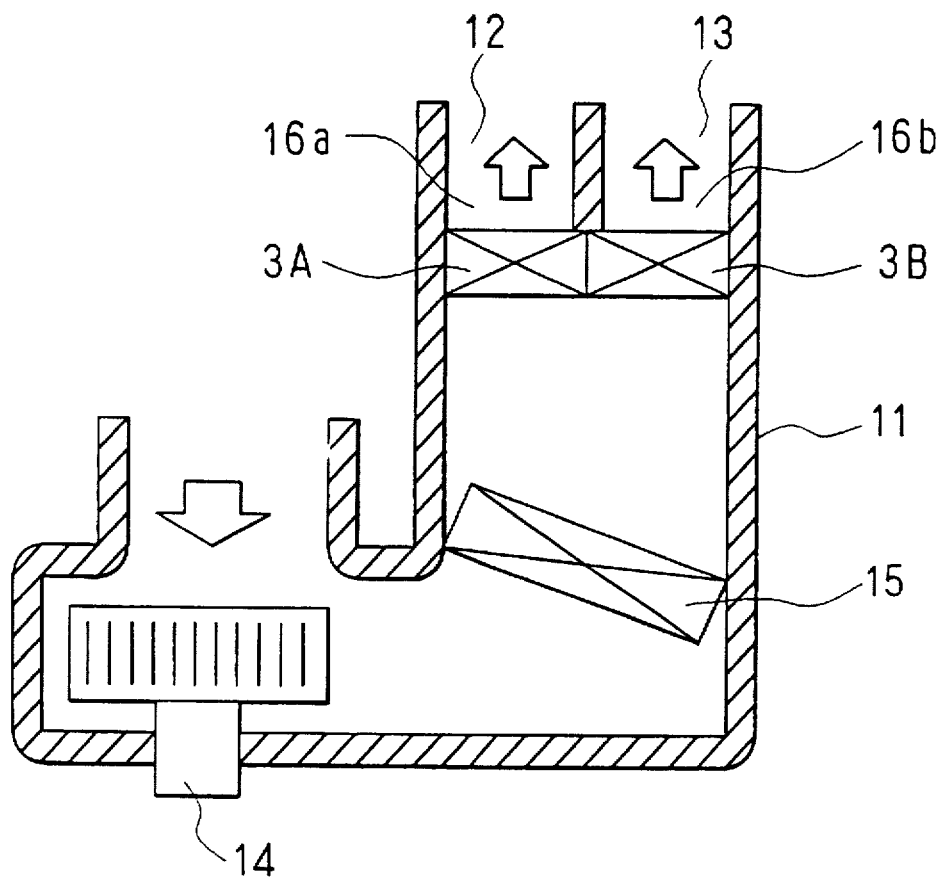
FIG. 2 is a cross-sectional view illustrating the arrangement of a first heater core 3A and second heater core 3B within an air conditioning duct 11 of the first embodiment.

In FIG. 2, an air conditioning duct 11 forms air passage for introducing the air into the passenger compartment. At one end of the air conditioning duct 11 are formed an inside air inlet and an outside air inlet (both not illustrated), and at the other end thereof are formed a plurality of air outlet groups 12 and 13. Air blowing means 14 pressurizes and blows air sucked from the inside air inlet or the outside air inlet to the air outlet groups 12 and 13.

A cooling heat exchanger 15 cools the air supplied by the air blowing means 14, which is specifically an evaporator of a refrigerating cycle (not illustrated). The first heater core 3A and the second heater core 3B are disposed in the air conditioning duct 11 entirely at the downstream side from the evaporator 15. Accordingly, all of the air passed through the evaporator 15 is reheated by the first heater core 3A and the second heater core 3B.

At the downstream side from the first heater core 3A is formed a driver's seat side passage 16a for introducing the air which have passed through the first heater core 3A to the driver's seat side. At the downstream side from the second heater core 3B is, formed a passenger's seat side passage 16b for introducing the air which have passed through the second heater core 3A to the passenger's seat side. The air outlet group 13 is disposed at the downstream side from the passenger's seat side passage 16b.

The air outlet group 12 specifically includes a side face air outlet and a center face air outlet on the driver's seat side for blowing the air toward the upper part of the driver's body, a foot air outlet on the drive seat side for blowing the air toward the feet of the driver, and a defroster air outlet for blowing the air toward the inside surface of the windshield.

The air outlet group 13 specifically includes a side face air outlet and a center face air outlet on the passenger's seat side for blowing the air toward the upper part of the passenger in the passenger's seat, a foot air outlet at the passenger's seat side for blowing the air toward the feet of the driver, and the defroster air outlet described above.

Figure 3:
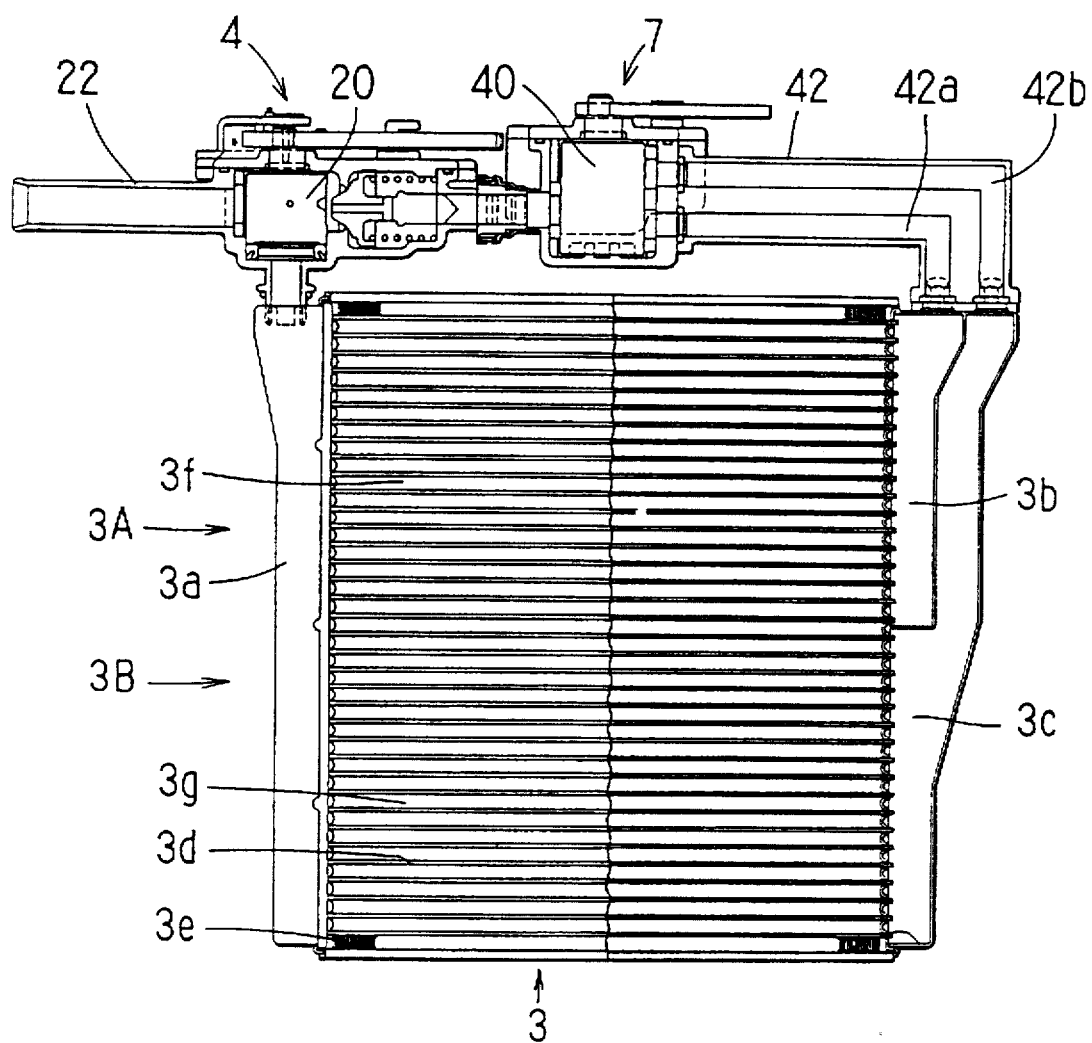
FIG. 3 is a partial cross-sectional front view illustrating the integrated structure of a total flow rate control valve 4 and a heater core 3 of the first embodiment.
Figure 4:
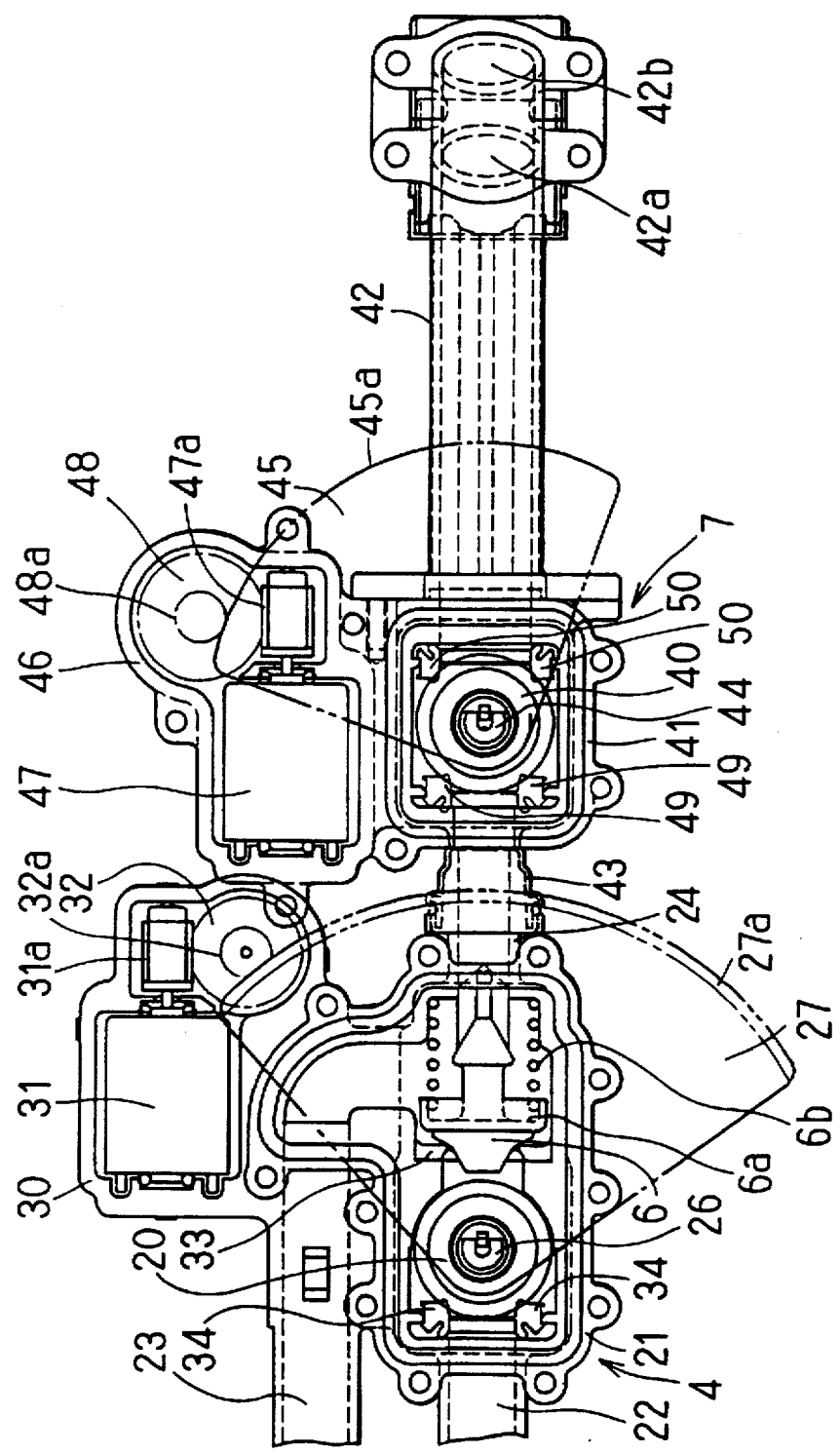
FIG. 4 is a top view of a part broken from FIG. 3.
Figure 5:
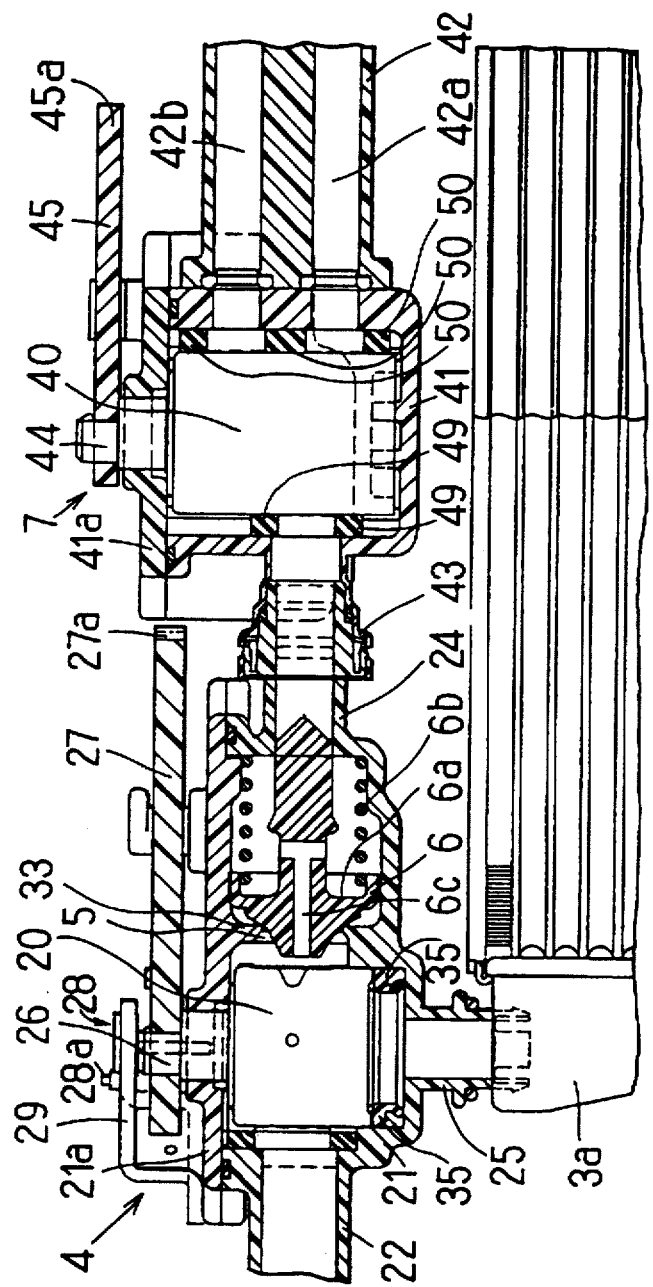
FIG. 5 is an enlarged view of a main portion of FIG. 3.
Figure 6:
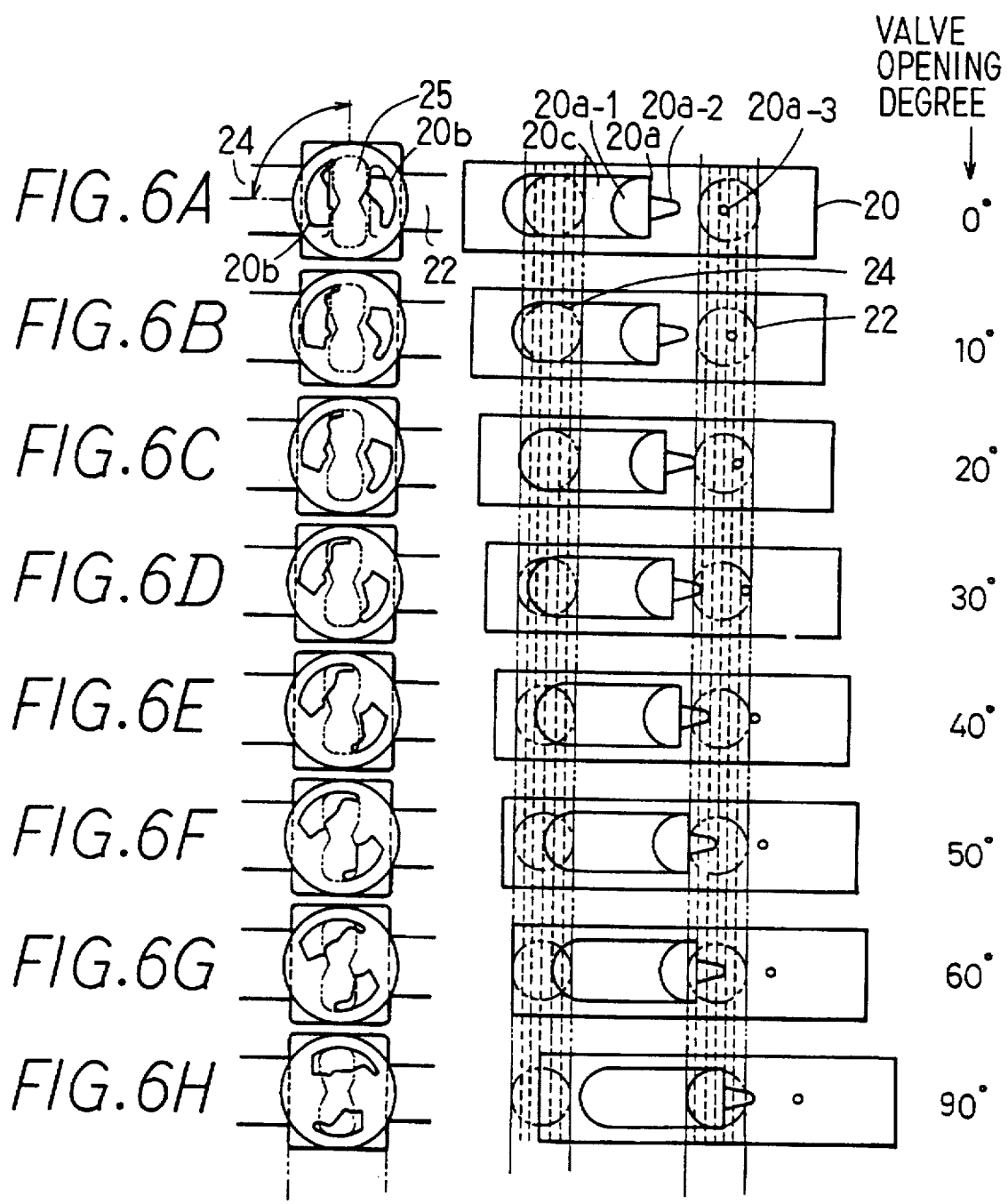
FIGS. 6A–6H are cross-sectional views of a valve element of the total flow rate control valve and development diagrams of the valve element.
Figure 7:
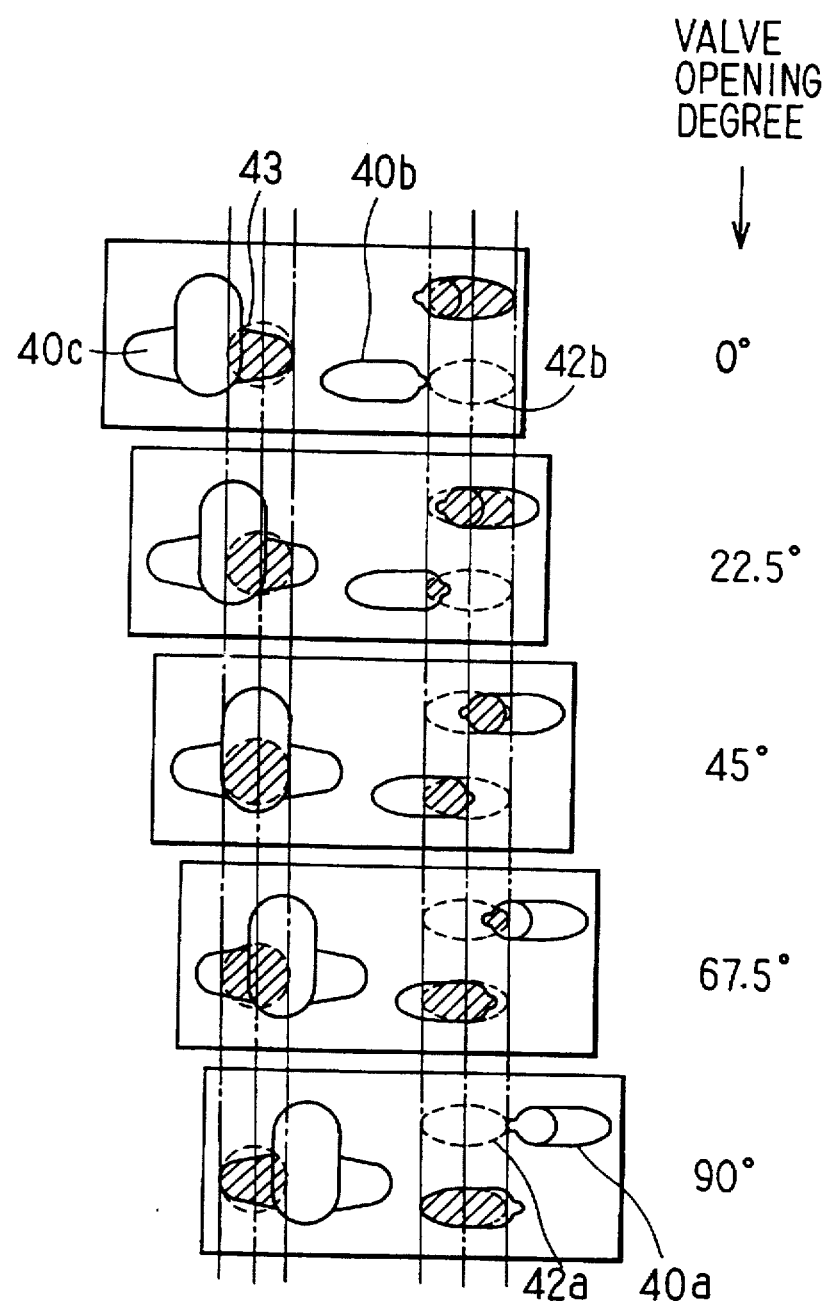
FIGS. 7A–7E are development diagrams of the valve element of the distribution valve.

The integrated structure of the total flow rate control valve 4, the distribution valve 7 and the heater core 3 will now be described referring to FIGS. 3 to 5. FIG. 3 is a partial cross sectional front view illustrating the integrated structure of the total flow rate control valve 4, the distribution valve 7 and the heater core 3. FIG. 4 is a top view, a partially cutaway from FIG. 3, in the state that top covers 21a and 41a and sector gears 27 and 45 are removed. FIG. 5 is an enlarged view of main portions of FIG. 3. For the convenience of the drawings, the leading lines and hatching for the detail parts of the total flow rate control valve 4 and distribution valve 7 are omitted in FIG. 3.

Firstly, the total flow rate control valve 4 is specifically described.

A valve element 20 of the total flow rate control valve 4 is cylindrically formed with a resin material and rotatably disposed within a flow control valve housing 21 also formed with a resin material. The valve element 20 includes a rotatable cylindrical rotor with the shaft extending in an up/down direction viewed in FIGS. 3 and 5.

Within the flow control valve housing 21 are formed integrally with a resin material a first hot water inlet pipe 22 for receiving the hot water from the engine 1, a first hot water outlet pipe 23 for returning the hot water to the engine 1, a second hot water inlet pipe 24 for receiving the hot water from the outlet of the heater core 3, and a second hot water outlet pipe 25 for leading the hot water from the first hot water inlet pipe 22 to the heater core 3. Within the flow rate control valve housing 21 is also formed the bypass circuit 5 for bypassing the hot water from the first hot water inlet pipe 22 through the valve element 20 to the first hot water outlet pipe 23.

Within the cylindrical valve element 20 are formed flow control passages 20a to 20c (FIGS. 6A–6H) for controlling the opening areas of the first hot water inlet pipe 22, second hot water outlet pipe 25 and bypass circuit 5 according to the prescribed correlations. A shaft 26 for rotatably operating the valve element 20 is integrally connected to the valve element 20 upwardly extending through the top cover 21a of the flow control valve housing 21.

The protruding end of the shaft 26 is D-shaped having a non-circular cross section. The D-shaped protruding end of the shaft 26 is integrally fitted into and connected to the rotation center hole of the sector gear 27 (in the position of the pivot of the sector) so that the shaft 26 and the sector gear 27 can be integrally rotated.

The upper end of the shaft 26 is connected to a potentiometer (a variable resistor) 28, which is a rotating position detecting means for detecting the position of the rotation of the valve element 20. A case portion 28a of the potentiometer 28 is fixed to the top cover 21a through a bracket 29. The controller 10 performs feedback control to a servomotor 31 described later based on the valve element rotating position signals of the potentiometer 28 so as to set the valve element 20 to the predetermined position.

Within the flow control valve housing 21 is integrally formed a driving mechanism case portion 30 housing valve driving mechanisms. Within the driving mechanism case portion 30 is disposed the electrical driving means 31 (specifically, the servomotor includes a DC motor), and at the end portion of the shaft of the servomotor 31 is formed a worm gear 31a.

The worm gear 31a meshes with a reduction spur gear 32, and the reduction spur gear 32 is rotatably supported by a bearing (not illustrated) disposed within the flow control valve housing 21. On the other hand, a worm gear 32a formed on the shaft of the reduction spur gear 32 meshes with a gear portion 27a of the outer circumferential portion of the sector gear 27. By using the sector gear 27, the speed reduction that requires several reduction gears in the conventional mechanism can be achieved with one gear.

Within the bypass circuit 5 formed within the valve housing 21 is disposed the constant differential pressure valve 6 made of a resin material. The constant differential pressure valve 6 is pressed by a coil spring 6b (spring means) positioned in contact with a bottom surface concave portion 6a thereof in the left direction viewed the FIGS. 3 to 5 (in the valve-closing direction). In the center portion of the constant differential pressure valve 6 is made a hole 6c to permit a predetermined amount of hot water to flow therethrough into the bypass circuit 5 even when the constant differential pressure valve 6 is closed.

There formed a clearance between the outer wall surface of the constant differential pressure valve 6 and the inner wall surface of the hot water inlet pipe 24 to permit the hot water from the distributor valve 7 to flow therethrough into the hot water outlet pipe 23.

A bulkhead 33 forms a valve seat. In the center portion of the bulkhead 33 is made a round hole which is opened/closed by the constant differential pressure valve 6. The round hole is so formed that the hot water inlet side thereof is expanded as a taper shape to reduce the passing water resistance.

In FIGS. 4 and 5, each of sealing members 34 and 35 made of an elastic material, such as rubber is formed in a rectangular shape having an opening in the center portion. The sealing members 34 and 35 are disposed between the outer circumferential surface of the valve element 20 and the inner circumferential surface of the flow control valve housing 21. The sealing members 34 and 35 prevent the hot water from directly flowing from/to the first hot water inlet pipe 22 and second hot water outlet pipe 25 to/from the bypass circuit 5 without flowing through the flow control passages 20a to 20c of the valve element 20.

The flow control passages 20a to 20c of the valve element 20 are specifically formed in a shape as illustrated in FIGS. 6A–6H. The flow control passage 20a includes a semicircular portion 20a-1, a slender portion 20a-2 and a small hole 20a-3 as illustrated in FIGS. 6A–6H. with the flow control passage 20a, it is so arranged that, when the opening degree of the valve element 20 is within a range from 0° (in non-heating) to the predetermined angle (20° according to this embodiment), an area Al For opening the first hot water inlet pipe 22 is a constant opening area fixed by the small hole 20a-3, and when the opening degree of the valve element 20 exceeds the above predetermined range, the opening area A1 increases according to the increase in the valve element opening degree.

To the left of the flow control passage 20a of the valve element 20 is continuously formed the flow control passage 20c with the flow control passage 20a. With the flow control passage 20c, it is so arranged that, when the opening degree of the valve element 20 is within a range from 0° to the predetermined angle (20° according to this embodiment), an area A2 for opening the second hot water inlet pipe 24 is an almost fully opened area, and when the opening degree of the valve element 20 exceeds the above predetermined range, the opening area A2 reduces according to the increase in the valve element opening degree.

On the other hand, as illustrated in FIGS. 6A–6H, an opening area A3 of the second hot water outlet pipe 25 (connected to the inlet of the heater core 3) disposed on the bottom side of the valve element 20 is so arranged to be 0 when the opening degree of the valve element 20 is 0°, and gradually increases from this state according to the increase in the valve element opening degree.

The distribution valve 7 will be described specifically.

In this embodiment, a valve element 40 of the distribution valve 7 is cylindrically formed with a resin material and rotatably housed within a distribution valve housing 41 formed also with a resin material. The valve element 40 includes a rotatable cylindrical rotor with the shaft extending in the up/down direction viewed in FIG. 3.

Within the distribution valve housing 41 are formed with a resin material a third inlet pipe 42 provided with a first hot water passage 42a for receiving the hot water from the first heater core 3A and a second hot water passage 42b for receiving the hot water from the second heater core 3B, and a third hot water outlet pipe 43 for returning the hot water to the second hot water inlet pipe 24 on the side of the total flow rate control valve 4.

Within the cylindrical valve element 40 are formed flow control passages 40a and 40b (FIGS. 7A–7E) for controlling the opening of the third inlet pipe 42 based on the predetermined correlations described later and a flow control passage 40c (FIGS. 7A–7E) for fully opening the opening area of the third hot water outlet pipe 43 substantially at a constant value. A shaft 44 for rotatably operating the valve element 40 is integrally combined to the valve element 40 and upwardly extends through a top cover 41a of the distribution valve housing 41.

A protruding end of the shaft 44 is D-shaped having a non-circular cross section, and the D-shaped protruding end of the shaft 44 is integrally fitted into and connected to the rotating center hole (in the position of the pivot of the sector) of the sector gear 45 and the shaft 44 so that the sector gear 45 can be integrally rotated.

The protruding end of the shaft 44 is connected to a potentiometer (a variable resistor) as a rotating position detecting means for detecting the rotating position of the valve element 40. A case portion (not illustrated) of the potentiometer is fixed to the top cover 41a. The controller 10 (FIG. 1) described above performs feedback control to a servomotor 47 described later based on the valve element rotating position signals of the potentiometer so as to set the valve element 40 to the predetermined position.

Within the distribution valve housing 41 is integrally formed a driving mechanism case portion 46 for housing valve driving mechanisms. Within the driving mechanism case portion 46 is disposed an electrical driving means 47 (specifically, a servomotor includes a DC motor), and at the end portion of the shaft of the servomotor 47 is formed a worm gear 47a.

The worm gear 47a meshes with a reduction spur gear 48, and the reduction spur gear 48 is rotatably supported by a bearing (not illustrated) disposed within the distribution valve housing 41. A worm gear 48a formed on the shaft of the reduction spur gear 48 is so arranged as to mesh with a gear portion 45a of the outer circumferential portion of the sector gear 45. By using the sector gear 45, the reduction that requires several gears in the conventional mechanism can be achieved with one gear.

Each of the sealing members made of an elastic material, such as rubber is formed in a rectangular shape with having an opening in the center portion thereof. The sealing members 49 and 50 are disposed between the outer circumferential surface of the valve element 40 and the inner circumferential surface of the distribution valve housing 41. The sealing members 49 and 50 prevent the hot water from directly flowing from/to the first hot water passage 42a and second hot water passage 42b of the third inlet pipe 42 to/from the third hot water outlet pipe 43 without flowing through the flow control passages 40a to 40c of the valve element 40.

The flow control passages 40a to 40c of the valve element 40 are specifically formed in a shape as illustrated in FIGS. 7A–7E. As can be understood from FIGS. 7A–7E, it is so arranged that, when the opening degree of the valve element 40 is 0°, an opening area B1 of the flow control passage 40a opening the first hot water passage 42a is the maximum and, on the other hand, an opening area B2 of the flow control passage 40b opening the second hot water passage 42b is 0.

Corresponding to the increase in the valve element opening degree, the opening area B1 decreases and the opening area B2 increases. When the opening degree of the valve element 40 is 90°, the opening area B1 is 0 and the opening area B2 is the maximum. On the other hand, an opening B3 of the flow control passage 40c opening the third hot water outlet pipe 43 is constantly almost the maximum regardless of the opening degree of the valve element 40.

The heater core 3 is, as illustrated in FIG. 3, provided with a hot water inlet side tank 3a at one end portion and a first hot water outlet side tank 3b and a second hot water outlet side tank 3c at the other end portion. Between the inlet side tank 3a and the first outlet side tank and between the inlet side tank 3a and the second outlet side tank 3c are parallelly arranged a plurality of flat tubes 3d, and between the respective flat tubes 3d adjacent to each other are disposed corrugated fins 3e.

The core portion is composed of the flat tubes 3d and the corrugated fins 3e is divided into a first core portion 3f corresponding to the first outlet side tank 3b and a second core portion 3g corresponding to the second outlet side tank 3c. Both the first core portion 3f and the second core portion 3g are constructed to be an all passing type (one way flow type) in which the hot water from the outlet side tank 3a flows in only one direction to the first outlet side tank 3b and the second outlet side tank 3c.

In this embodiment, the first heater core 3A is composed of the inlet side tank 3a, the first core portion 3f and the first outlet side tank 3b, and the second heater core 3B is composed of the inlet side tank 3a, the second core portion 3g and the second outlet side tank 3c. The first outlet side tank 3b communicates with the first hot water passage 42a, and the second outlet side tank 3c communicates with the second hot water passage 42b.

The control process for the total flow rate control valve 4 and distribution valve 7, executed by the microcomputer of the controller 10 (FIG. 1), will be described referring to the flow chart illustrated in FIG. 8.

Figure 8:
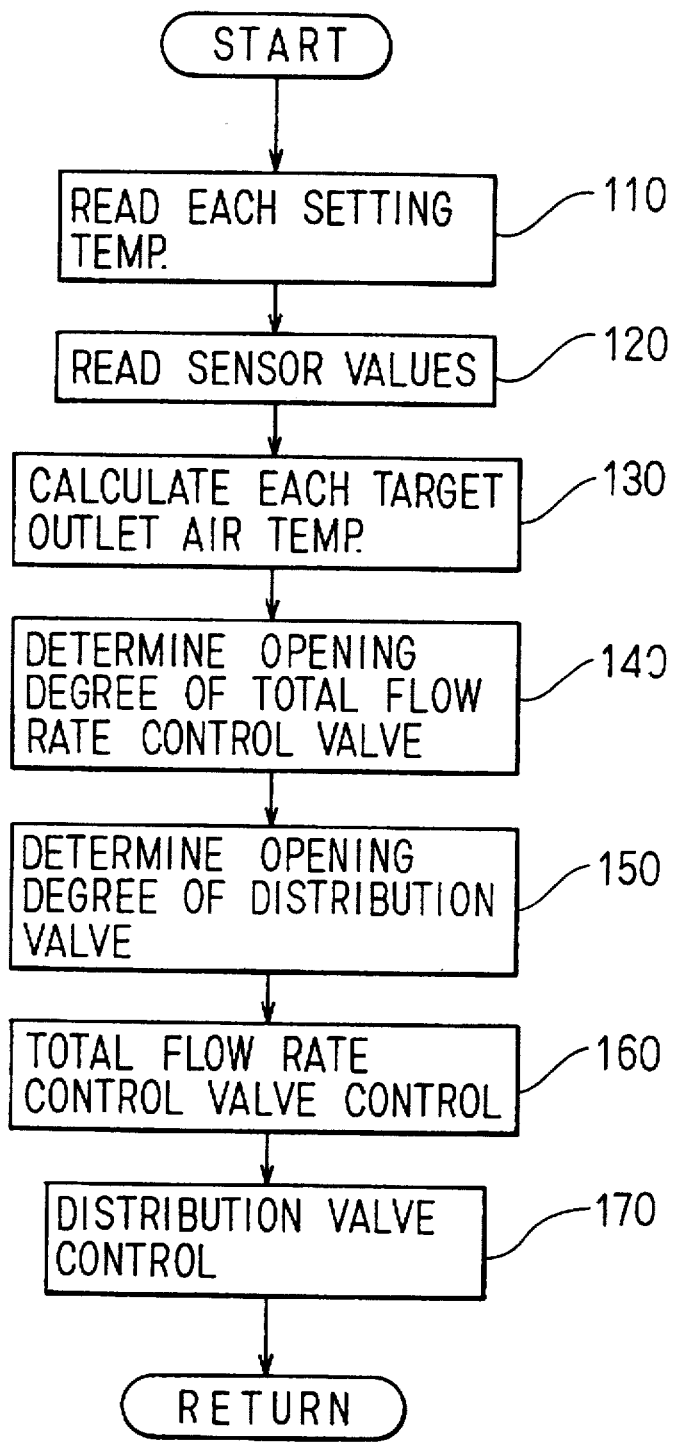
FIG. 8 is a flow chart illustrating the control processing performed by the microcomputer of the fist embodiment.

The routine illustrated in FIG. 8 starts when the ignition switch of an automobile is turned ON to supply electric power to the controller 10 and the automatic air conditioning switch (not illustrated) is turned ON to automatically control the air conditioning system. Then, firstly in the step 110, the preset temperature on the driver side Tset(Dr) set by the driver's seat temperature setting device 9a and the preset temperature on the assistant driver's seat side Tset(As) set by the assistant driver's seat temperature setting device 9b are read.

In the step 120, the inside air temperature Tr detected by the inside air temperature sensor 8a, the outside air temperature Tam detected by the outside air temperature sensor 8b, and the amount Ts of the sunlight, detected by the insolation sensor 8c, are read. In the step 130, the target blowing air temperature on the driver's seat side TAO(Dr) and the target blowing air temperature on the assistant driver's seat side TAO(AS) are calculated by substituting the values read in the previous steps 110 and 120 in the following equations (1) and (2):

$$TAO(Dr)=Kset(Dr)\times Tset(Dr)-Kr\times Tr-Kam\times Tam-Ks\times Ts+C \quad (1)$$

$$TAO(As)=Kset(As)\times Tset(As)-Kr\times Tr-Kam\times Tam-Ks\times Ts+D \quad (2)$$

wherein, Kset(Dr), Kset(As), Kr, Kam and Ks are control gains, and C and D are constants.

Figure 9:
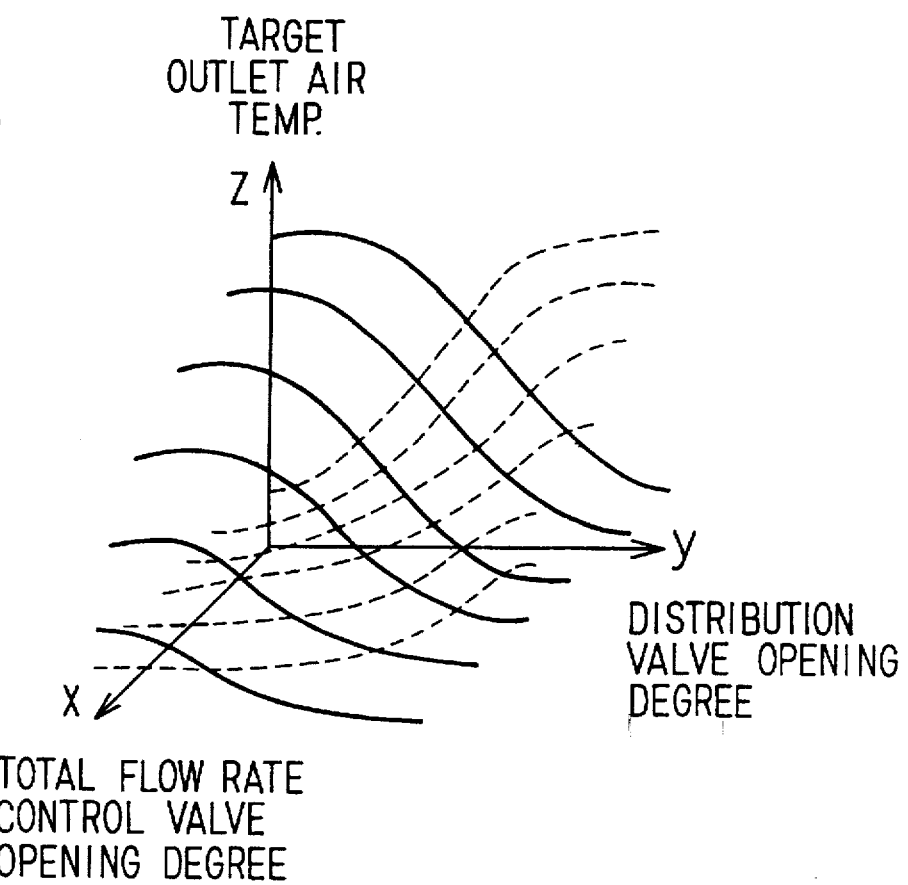
FIG. 9 is a three-dimensional map indicating the relations among the target blowing air temperature, the opening degree of the total flow rate control valve and the opening degree of the distribution valve of the first embodiment.
Figure 12:
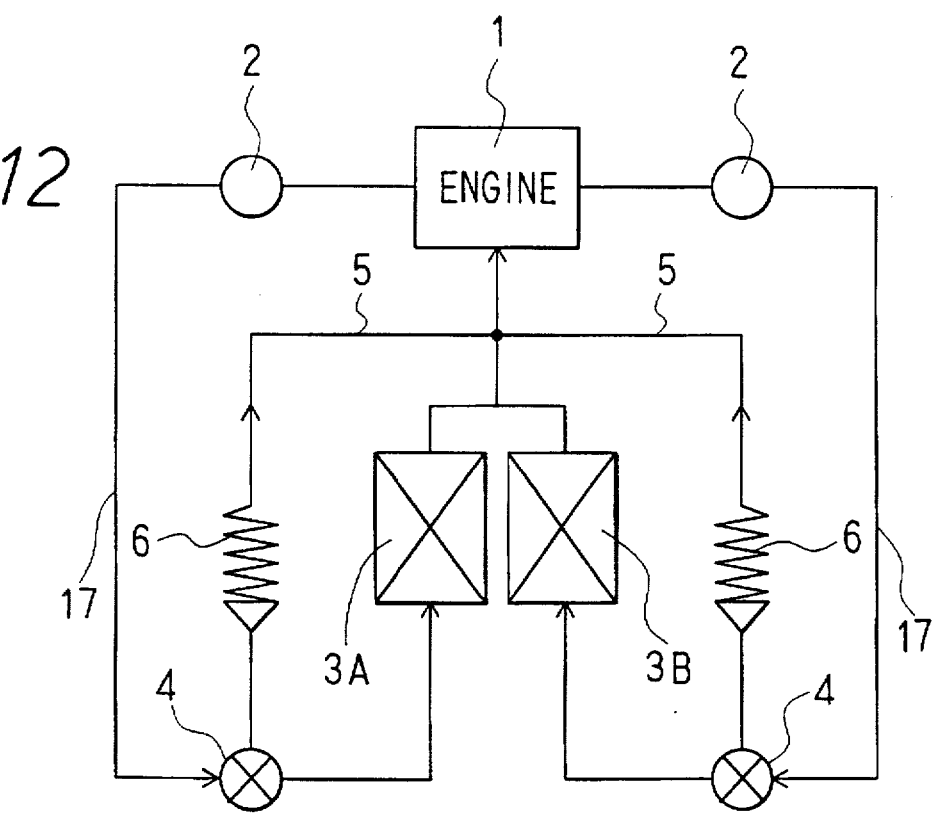
FIG. 12 is a diagram of a hot water circuit of a comparison case.

In the steps 140 and 150, the opening degree of the total flow rate control valve 4 and the opening degree of the distribution valve 7 are determined based on the values TAO(Dr) and TAO(AS) calculated in the previous step 130 and the three-dimensional map illustrated in FIG. 9.

The three-dimensional map will be described in detail.

Figure 11B:
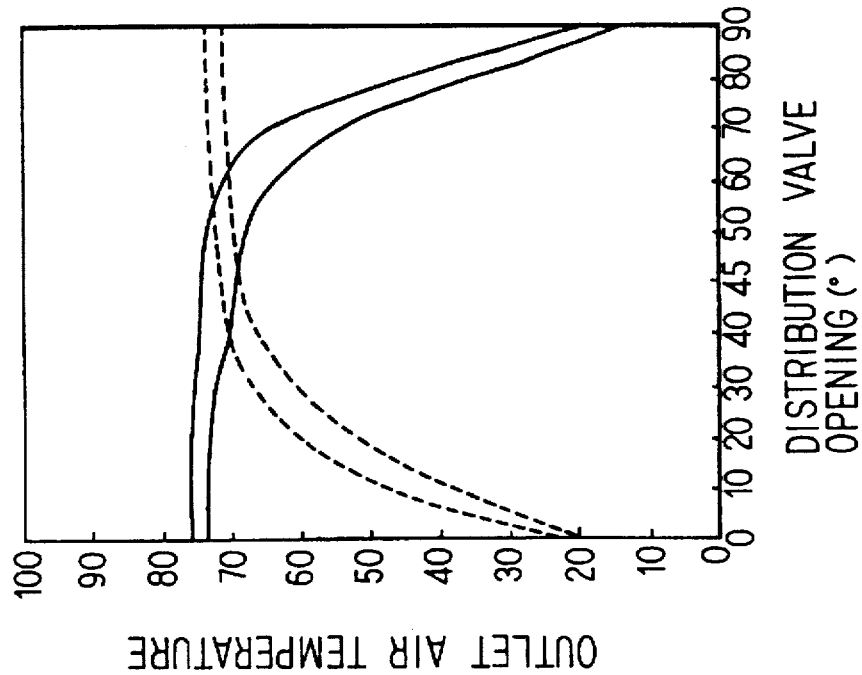
Figure 11A:
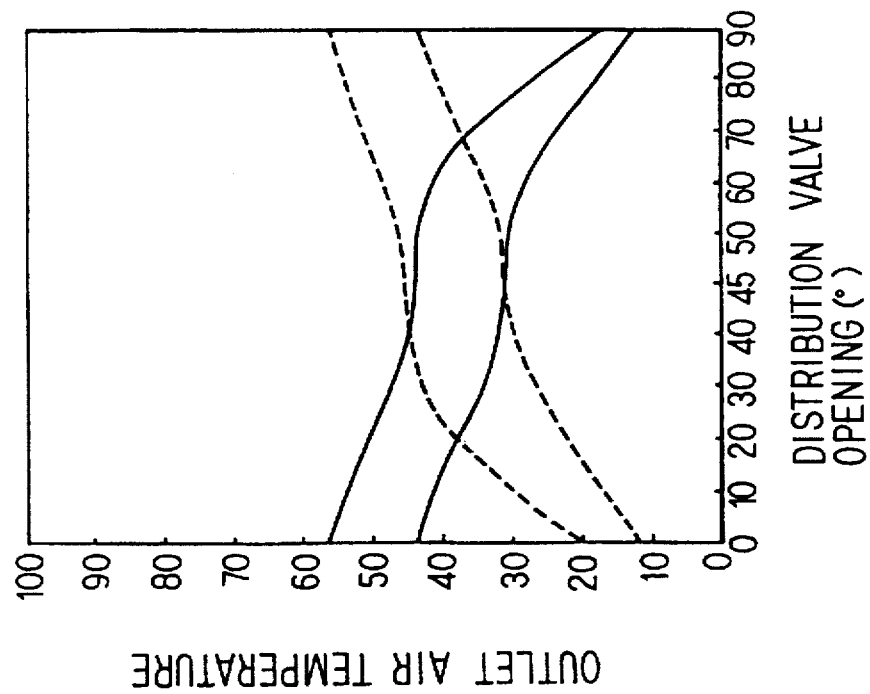

The three-dimensional map illustrated in FIG. 9 has been prepared based on the data obtained through experiments. Examples of the three-dimensional map are illustrated in FIGS. 10 and 11. In the respective maps, the data in two full lines indicate the temperature of the air immediately after passing through the first core portion 3f, and the data in the upper full line refers to the left half portion of the first core portion 3f viewed in FIG. 3 and the lower full line refers to the right half portion of the first core portion 3f viewed in FIG. 3.

The data in two broken lines indicate the temperature of the air immediately after passing the second core portion 3g, and the upper broken line refers to the left half portion of the second core portion 3g viewed in FIG. 3 and the lower broken line refers to the right half portion of the second core portion 3g viewed in FIG. 3.

The three-dimensional map in FIG. 9 is obtained by combining numerous data which are averaged based on the data in the two full lines and the data in the two broken lines respectively. In this embodiment, the three-dimensional map is stored in the ROM with the z-axis as the target blowing air temperatures (TAO(Dr) and TAO(As)).

Here, all of the data in the four maps illustrated in FIGS. 10 and 11 were obtained through experiments conducted under the conditions that the temperature of the air immediately after passing through the evaporator 15 is approximately 3° C., the temperature of the air immediately before passing through the heater core 3 is approximately 8° C., the water temperature at the inlet of the heater core 3 (specifically, within the second hot water outlet pipe 25) is approximately 85° C., and the water temperature at the outlet of the heater core 3 (specifically, within the second hot water inlet pipe 24) is approximately 80° C.

The method for determining each opening degree of the total flow rate control valve 4 and the opening degree of the distribution valve 7 will be described in detail.

Firstly, planes are searched which correspond to the target blowing air temperature at the driver's seat side TAO(Dr) and the target blowing air temperature at the passenger's seat side TAO(As) respectively, calculated in the previous step 130, among the planes parallel to the x-y plane of FIG. 9. One line is formed on each plane, and the opening degree of the total flow rate control valve 4 and the opening degree of the distribution valve 7 are determined by using the point of intersection obtained by projecting these lines onto the x-y plane.

After the opening degree of the total flow rate control valve 4 and the opening degree of the distribution valve 7 have been determined as described above, control signals are output to the servomotors 31 and 47 (FIG. 4) in the next steps 160 and 170 in such a manner that the actual valve opening degrees can be adjusted to the opening degrees determined as described above. Then, the process returns to the start.

In this embodiment, as described above, the total flow rate of the hot water flowed through the first heater core 3A and the second heater core 3B is controlled by the total flow rate control valve 4 and the hot water at the controlled flow rate is linearly distributed to the first heater core 3A and the second heater core 3B by the distribution valve 7. Therefore, the supply rates of the respective hot water to the first heater core 3A and the second heater core 3B can be linearly controlled. As a result, the driver's seat temperature and the passenger's seat temperature can be linearly controlled.

Furthermore, the total flow rate control valve 4 is so constructed that the servomotor 31 rotates the valve element 20 of the cylindrical rotor and the flow control passages 20a to 20c of the valve element 20 control the areas for opening the passages within the first hot water inlet pipe 22, the second hot water inlet pipe 24 and the second hot water outlet pipe 25 so as to control the flow rate of the hot water flowing through the first hot water inlet pipe 22, the second hot water inlet pipe 24 and the second hot water outlet pipe 25. Therefore, the manufacturing cost of the total flow rate control valve 4 can be reduced as compared with the manufacturing cost of the solenoid valve which has generally been known.

Moreover, in this embodiment, it is so arranged that the bypass circuit 5 is disposed within the housing 21 of the total flow rate control valve 4 and the bypass circuit 5 is provided with the constant differential pressure valve 6 which opens corresponding to the increase in the hot water pressure. Therefore, even if the hot water supply pressure of the engine 1 fluctuates, the hot water pressure on the first heater core 3A and the second heater core 3B can be constantly maintained, and thereby the fluctuation in the blowing air temperature can be suppressed.

Further, in this embodiment, the distribution valve 7 is so constructed that the servomotor 47 rotates the valve element 40 of the cylindrical rotor and the flow control passages 40a to 40c of the valve element 40 control the areas for opening the passages within the third hot water inlet pipe 42 and the third hot water outlet pipe 43 so as to control the flow rate of the hot water flowing through the third hot water inlet pipe 42 and the third hot water outlet pipe 43. Therefore, the manufacturing cost of the distribution valve 7 can be reduced as compared with the manufacturing cost of the solenoid valve which has been generally known.

On the other hand, the distribution valve 7 is disposed at the portion 17d on which the first passage 17b and the second passage 17c converge again. Therefore, the function of distributing the hot water, flow rate of which has been controlled by the total flow rate control valve 4 to each of the first heater core 3A and the second heater core 3B, can be performed by one valve.

Also, in this embodiment, the first heater core 3A and the second heater core 3B are integrally formed into one heater core 3 and the total flow rate control valve 4 and the distribution valve 7 are integrally formed with the heater core 3. Therefore, the total flow rate control valve 4, the distribution valve 7 and the heater core 3 can be easily installed or mounted into a vehicle as one integrated structure.

In addition, in this embodiment, it is so arranged that after the total flow rate is controlled by the total flow rate control valve 4 provided with the constant differential pressure valve 6 for absorbing the hot water pressure, the flow rate of the hot water is distributed by the distribution valve 7 to each of the first heater core 3A and the second heater core 3B. Therefore, as illustrated as a comparison case in FIG. 12, the number of parts and components can be reduced by the elimination of the constant differential pressure valve 6 from the distribution valve 7 as compared with a case where two total flow rate control valves 4 are used to linearly control the flow rate of the hot water to each of the first heater core 3A and the second heater core 3B.

Figure 13:
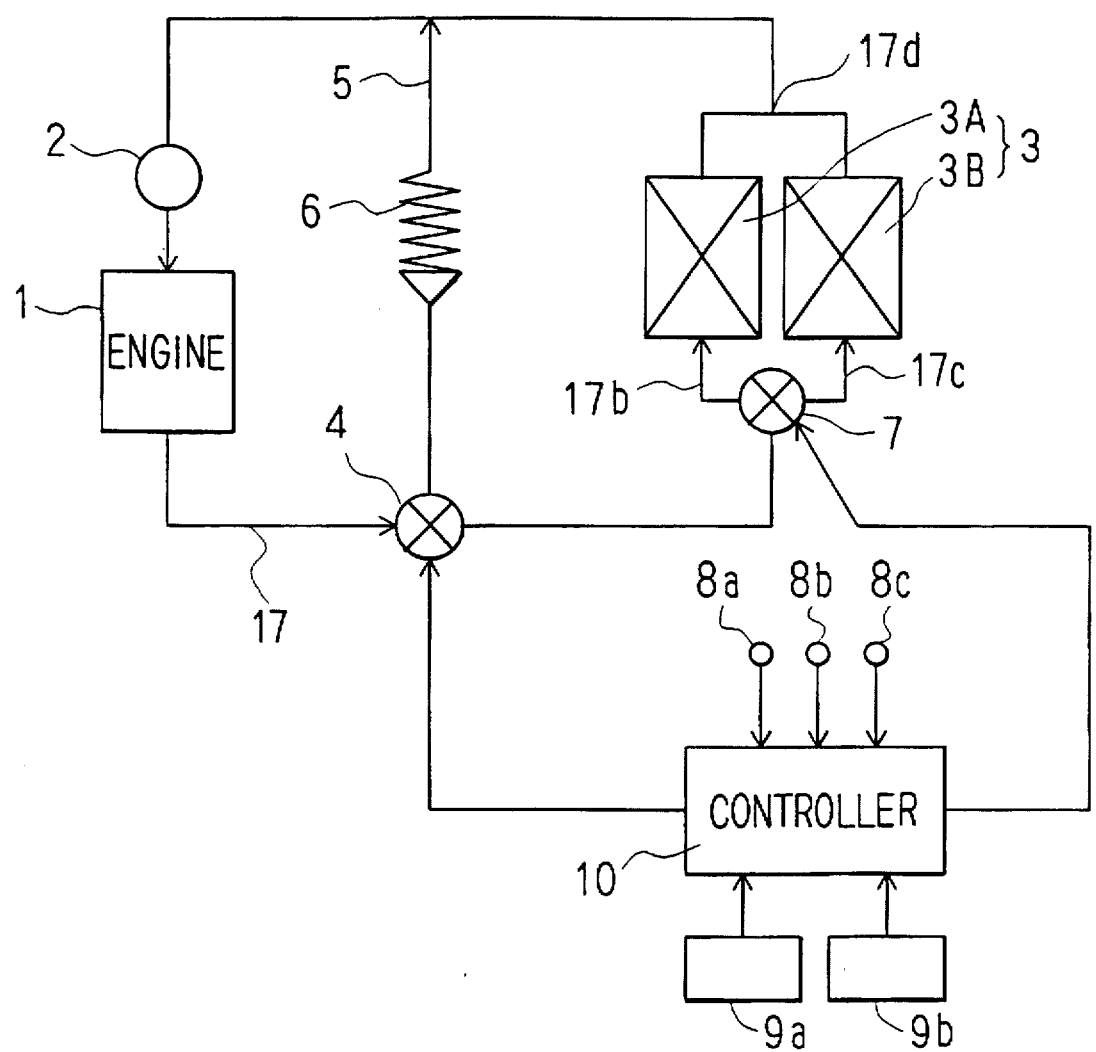
FIG. 13 is a diagram of a hot water circuit of a modification.
Figure 14:
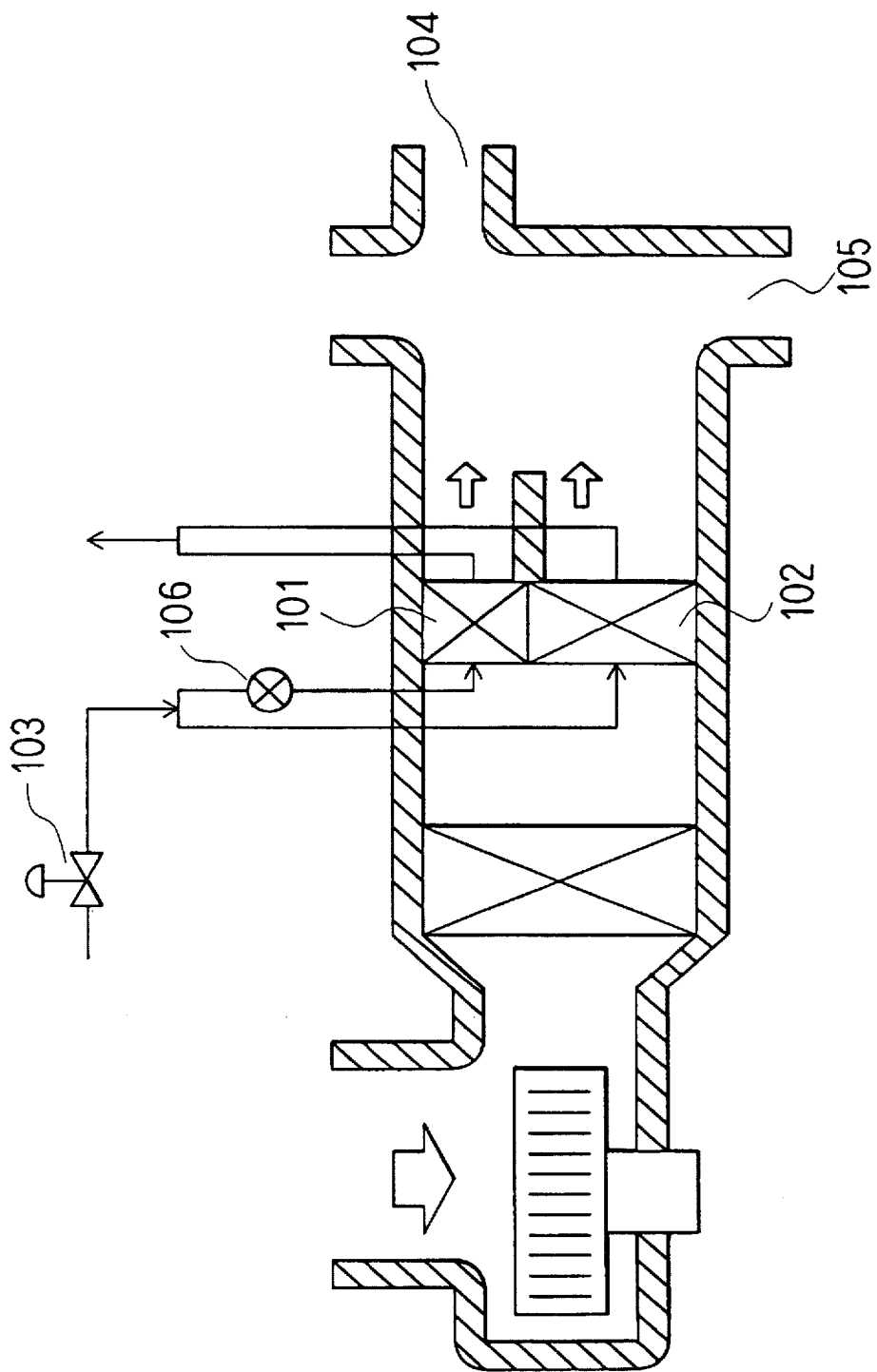
FIG. 14 a view schematically illustrating a conventional hot water flow control type air conditioning system.

As illustrated in FIG. 13, the distribution valve 7 may be disposed at the point 17a (FIG. 1) from which the hot water circuit 17 branches into the first passage 17b and the second passage 17c.

In each embodiment described above, it is so arranged that the driver's seat space is heated by the first heater core 3A and the passenger's seat space is heated by the second heater core 3B, however, the construction should not be limited to such arrangement, but it may also be so arranged that, for example, the front seat space is heated by the first heater core 3B and the rear seat space is heated by the second heater core 3B.

In each embodiment described above, it is so arranged that the target blowing air temperature on the driver's seat side TAO(Dr) and the target blowing air temperature on the passenger's seat side TAO(AS) are calculated so as to determine the opening degree of the total flow rate control valve 4 and the opening degree of the distribution valve 7 based on these target blowing air temperatures and the map illustrated in FIG. 9, however, it may also be so arranged that means are provided for both the first heater core 3A and the second heater core 3B for detecting the temperatures of the air immediately after passing therethrough so as to control the total flow rate control valve 4 and the distribution valve 7 is such a manner that the detected temperatures can be set to the respective target temperatures.

Also, in each embodiment described above, one heater core 3 is divided into two portions: the first heater core 3A and the second heater core 3B. However, the first heater core 3A and the second heater core 3B may be independently constructed.

Furthermore, in each embodiment described above, the valve elements 20 and 40 are so structured as to be electrically driven by the servomotors 31 and 47 respectively. However, it may be also so arranged that pins are integrally formed on the top surfaces of the respective sector gears 27 and 45, and levers, cables, etc. are connected to the respective pins.

Moreover, in each embodiment described above, it is so arranged that one distribution valve 7 is disposed in the portion 17a or 17d. However, it may also be so arranged that the distribution valve 7 is disposed in each of the first passage 17b and the second passage 17c and the opening degree of each distribution valve 7 is controlled.

Although the present invention has been fully described in connection with the preferred embodiments thereof with reference to the accompanying drawings, it is to be noted various changes and modifications will become apparent to those skilled in the art. Such changes and modifications are to be understood as being included within the scope of the present invention as defined in the appended claims.

What is claimed is:

1. A heating apparatus for a vehicle equipped with a water-cooled engine and having a passenger compartment, comprising:

a first heat exchanger disposed in a first passage constituting a part of a hot water circuit for circulating hot water heated by said engine for heating a first space within said passenger compartment by heat exchanging said hot water with air;

a second heat exchanger disposed in a second passage constituting a part of said hot water circuit and disposed in parallel to said first passage for heating a second space within said passenger compartment by heat exchanging said hot water with air;

a total flow rate control valve disposed within said hot water circuit, said total flow rate control valve including a first single rotary valve for controlling a total flow rate of said hot water flowing through said first heat exchanger or said second heat exchanger; and a distribution valve disposed within said hot water circuit, said distribution valve including a second single rotary valve for linearly distributing said hot water, flow rate of which has been controlled by said total flow rate control valve to said first heat exchanger and said second heat exchanger.

2. A heating apparatus according to claim 1, wherein, said hot water circuit includes a bypass circuit bypassing said first heat exchanger and said second heat exchanger.

3. A heating apparatus according to claim 2, further comprising:

a pressure responsive valve disposed in said bypass circuit so as to be opened by an increase in said hot water pressure.

4. A heating apparatus according to claim 3, wherein, said pressure responsive valve is integrally disposed with said total flow rate control valve.

5. A heating apparatus according to claim 4, wherein, said total flow rate control valve and said pressure responsive valve are incorporated into an identical housing.

6. A heating apparatus according to claim 1, wherein, said distribution valve is disposed at a point on which said first passage and said second passage join together.

7. A heating apparatus according to claim 1, wherein said distribution valve is disposed at a portion from which said hot water circuit branches into said first passage and said second passage.

8. A heating apparatus according to claim 1, wherein, said total flow rate control valve is disposed on an upstream side from said portion from which said hot water circuit branches into said first passage and said second passage.

9. A heating apparatus according to claim 1, wherein, said total flow rate control valve includes:

a flow control valve housing;

a first hot water inlet pipe disposed within said flow control valve housing for leading said hot water from said engine;

a first hot water outlet pipe disposed within said flow control valve housing for returning said hot water to said engine;

a second hot water outlet pipe disposed within said flow control valve housing for sending said hot water received from said first hot water inlet pipe to said first heat exchanger and said second heat exchanger;

a second hot water inlet pipe disposed within said flow control valve housing for leading said hot water received from said first heat exchanger and said second heat exchanger to said flow control valve housing;

a bypass circuit formed within said flow control valve housing for bypassing said hot water received from said first hot water inlet pipe directly to said first hot water outlet pipe; and a flow control valve element disposed within said flow control valve housing for controlling an opening area of a hot water flow passage communicating from said first hot water inlet pipe to said second hot water outlet pipe.

10. A heating apparatus according to claim 1, wherein said distribution valve includes:

a distribution valve housing;

a third hot water inlet pipe disposed within said distribution valve housing and provided therein with said first hot water passage and said second hot water passage;

a third hot water outlet pipe disposed within said distribution valve housing for returning said hot water received from said third hot water inlet pipe to said engine; and a distribution valve element disposed within said distribution valve housing for controlling an opening area of a first hot water flow passage communicating from said first hot water passage to said third hot water outlet pipe and also controlling an opening area of a second hot water flow passage communicating from said second hot water passage to said second hot water outlet pipe.

11. A heating apparatus according to claim 1, wherein:

said first heat exchanger is composed of a part of one heat exchanger and said second heat exchanger is composed of the remaining part of said heat exchanger; and said total flow rate control valve and said distribution valve are integrally constructed with said heat exchanger.

12. A heating apparatus for a vehicle equipped with a water-cooled engine and having a passenger compartment, comprising:

a first heat exchanger disposed in a first passage constituting a part of a hot water circuit for circulating hot water heated by said engine for heating a first space in said passenger compartment by heat exchanging said hot water with air;

a second heat exchanger disposed in a second passage constituting a part of said hot water circuit and disposed in parallel to said first passage for heating a second space within said passenger compartment by heat exchanging said hot water with air;

a total flow rate control valve disposed within said hot water circuit, said total flow rate control valve including a first single rotary valve for controlling said total flow rate of hot water flowing through said first heat exchanger or said second heat exchanger;

a distribution valve disposed within said hot water circuit, said distribution valve including a second single rotary valve for linearly distributing said hot water, flow rate of which has been controlled by said total flow rate control valve to said first heat exchanger and said second heat exchanger;

a bypass circuit disposed within said hot water circuit for bypassing said first heat exchanger and said second heat exchanger; and a pressure responsive valve disposed within said hot water circuit so as to be opened by an increase in said hot water pressure;

wherein said first heat exchanger and said second heat exchanger are composed of one heat exchanger and said total flow rate control valve, said distribution valve, said bypass circuit and said pressure responsive valve are disposed within an identical housing.

13. a heating apparatus for a vehicle equipped with a water-cooled engine and having a passenger compartment, comprising:

means for forming a single hot water circuit for circulating hot water heated by said engine;

a first heat exchanger disposed in said hot water circuit, for heating a first space within said passenger compartment by heat exchanging said hot water with air;

a second heat exchanger disposed in said hot water circuit in parallel with said first heat exchanger, for heating a second space within said passenger compartment by heat exchanging said hot water with air;

a total flow rate control valve disposed in said hot water circuit at an upstream side of said first and second heat exchangers for controlling a total flow rate of said hot water toward said first and second heat exchangers; and a distribution valve disposed in said hot water circuit between said total flow rate control valve and said first and second heat exchangers for linearly distributing said hot water to said first heat exchanger and said second heat exchanger.

* * * * *